United States Patent
Sade et al.

(10) Patent No.: US 8,583,865 B1
(45) Date of Patent: Nov. 12, 2013

(54) CACHING WITH FLASH-BASED MEMORY

(75) Inventors: Gilad Sade, Newton, MA (US); Thomas E. Linnell, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 756 days.

(21) Appl. No.: 12/004,992

(22) Filed: Dec. 21, 2007

(51) Int. Cl.
G06F 12/00 (2006.01)

(52) U.S. Cl.
USPC ........... 711/113; 711/103; 711/114; 711/118; 711/E12.016

(58) Field of Classification Search
USPC ............... 711/103, 114, E12.001, E12.016
See application file for complete search history.

(56) References Cited

U.S. PATENT DOCUMENTS

| | | | | |
|---|---|---|---|---|
| 5,680,579 A * | 10/1997 | Young et al. | ................... | 711/157 |
| 5,774,643 A * | 6/1998 | Lubbers et al. | ................... | 714/20 |
| 5,896,492 A * | 4/1999 | Chong, Jr. | ......................... | 714/3 |
| 6,085,333 A * | 7/2000 | DeKoning et al. | ........... | 714/6.32 |
| 6,098,191 A * | 8/2000 | Yamamoto et al. | ........... | 714/766 |
| 6,647,499 B1 * | 11/2003 | Morcom | ....................... | 713/300 |
| 6,766,491 B2 * | 7/2004 | Busser | ......................... | 714/770 |
| 2002/0169935 A1 * | 11/2002 | Krick et al. | ................... | 711/167 |
| 2003/0233525 A1 * | 12/2003 | Reeves | ......................... | 711/162 |
| 2005/0117418 A1 * | 6/2005 | Jewell et al. | ................... | 365/202 |
| 2006/0294356 A1 * | 12/2006 | Kumar et al. | ..................... | 713/2 |
| 2007/0198796 A1 * | 8/2007 | Warren, Jr. | ..................... | 711/165 |
| 2007/0220227 A1 * | 9/2007 | Long | ............................ | 711/165 |

* cited by examiner

Primary Examiner — Larry Mackall
(74) Attorney, Agent, or Firm — Krishnendu Gupta; Jason A. Reyes; Deepika Bhayana

(57) ABSTRACT

A system is used in caching with flash-based memory. First and second controllers communicate with a flash-based cache. A magnetic disk array is in communication with the flash-based cache. The flash-based cache has a dual ported link to the first and second controllers. The flash-based cache has flash-based memory components arranged in a RAID data protection scheme.

13 Claims, 4 Drawing Sheets

CACHING WITH FLASH-BASED MEMORY

BACKGROUND

1. Technical Field

This application relates to caching with flash-based memory.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with a write operation, the data storage system may utilize a variety of different techniques such as write-back caching. With write-back caching, the data storage system may temporarily cache data received from a host within its storage cache and destage the cached data at different times onto the physical disk drives. As known in the art, the cache used in the data storage system may be implemented using a fast, volatile memory, such as RAM (random access memory), particularly dynamic RAM (DRAM). The data storage system may utilize a backup or secondary power supply for use in connection with preventing loss of cached data in the event of a power failure. In the event of a power failure, the data storage system may utilize the backup power supply to provide power to the storage processor and physical data storage devices of the data storage system for a short period of time. During this period of time, the storage processor stores the data from its cache to a dedicated area on the storage devices that may be referred to as a "vault" so that the vault includes the cached data which has not yet been destaged onto the physical storage devices.

It should be noted that a data storage system may include multiple storage processors storing data to a same set of storage devices. Each of the storage processors may have its own cache so that cached data for the write operations, as well as possibly other cached data, may be mirrored in the caches of the storage processors. Multiple storage processors may be desirable for use in providing fault tolerance, higher throughput, and the like.

In a particular example, as is known in the art, large host computer systems require large capacity data storage systems. These large computer systems generally include data processors which perform many operations on data introduced to the computer system through peripherals including the data storage system. The results of these operations are output to peripherals, including the storage system.

In accordance with the example, one type of data storage system is a magnetic disk storage system. Here a bank of disk drives and the computer system are coupled together through an interface. The interface includes "front end" directors (or controllers) and "back end" disk directors (or controllers, also known as rear end directors or disk directors). The interface operates the directors in such a way that they are transparent to the computer. That is, data is stored in, and retrieved from, the bank of disk drives in such a way that the computer system merely thinks it is operating with one large memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the front-end directors and disk directors, an addressable global cache memory. The global cache memory is a semiconductor memory connected to all of the front end directors and back end directors and is provided to rapidly store data from the computer system before storage in the disk drives, and, on the other hand, store data from the disk drives prior to being sent to the computer. The cache memory being a semiconductor memory, as distinguished from a magnetic memory as in the case of the disk drives, is much faster than the disk drives in reading and writing data.

In operation, when the host computer wishes to store end-user (i.e., host computer) data at an address, the host computer issues a write request to one of the front-end directors to perform a write command. One of the front-end directors replies to the request and asks the host computer for the data. After the request has passed to the requesting one of the front-end directors, the director determines the size of the end-user data and reserves space in the cache memory to store the request. The front-end director then produces control signals for such front-end director. The host computer then transfers the data to the front-end director. The front-end director then advises the host computer that the transfer is complete. The front-end director looks up in a Table, not shown, stored in the cache memory to determine which one of the rear-end directors is to handle this request. The Table maps the host computer address into an address in the bank of disk drives. The front-end director then puts a notification in a "mail box" (not shown and stored in the cache memory) for the rear-end director which is to handle the request, the amount of the data and the disk address for the data. Other rear-end directors poll the cache memory when they are idle to check their "mail boxes". If the polled "mail box" indicates a transfer is to be made, the rear-end director processes the request, addresses the disk drive in the bank, reads the data from the cache memory and writes it into the addresses of a disk drive in the bank. When end-user data previously stored in the bank of disk drives is to be read from the disk drive and returned to the host computer, the interface system operates in a reciprocal manner. The internal operation of the interface (e.g. "mail-box polling", event flags, data structures, device tables, queues, etc.) is controlled by interface state data (sometimes referred to as metadata) which passes between the directors through the cache memory. Further, end-user data is transferred through the interface as a series of multi-word transfers, or bursts. Each word transfer in a multi-word transfer is here, for example, 64 bits. Here, an end-user data transfer is made up of, for example, 32 bursts. Each interface state data word is a single word having, for example, 64 bits.

In another example, a data storage system has a pair of storage processors connected to an array of disk drives. For example, such a system is disclosed in U.S. Pat. No. 5,922,077, which is hereby incorporated by reference herein, and which describes a dual data storage controller system in which the controllers are connected to one another by a peer-to-peer communication link. Each data storage controller is connected to a fibre channel loop in connection with each of the disk drives in the disk array. Fail-over switches provide each data storage controller with a means for connecting to either one of the fibre channel loops.

Each storage processor has its own write cache memory and the two storage processors may be configured to communicate with each other through a Cache Mirroring Interface (CMI) bus in the peer-to-peer communication link in order to maintain cache coherency as well as to minimize the impact of cache mirroring disk writes. In particular, the CMI bus enables a copy of data to be available on both storage processing units before the disk write operation is complete. In this system, a first storage processing unit has a first CMI interface circuit, a second storage processing unit has a second CMI interface circuit, and the first and second CMI interface circuits connect to each other through the CMI bus.

As is also known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer (e.g., here, a back end director) along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

The host computer, which for some purposes may include the storage system itself, may not address the disk drives of the storage system directly, but rather access to data may be provided to one or more host computers from what the host computers view as a plurality of logical devices or logical volumes (LVs), also referred to as LUNs. The LUNs may or may not correspond to the actual disk drives. For example, one or more LUNs may reside on a single physical disk drive. In another example, a LUN may use storage space from multiple physical disk drives. An LV or LUN (logical unit number) may be used to refer to the foregoing logically defined devices or volumes.

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a LUN is configured so that its data is written across multiple disk drives in the striping technique, the LUN is operating in RAID-0 mode. Alternatively, if the LUN's parity information is stored on one disk drive and its data is striped across multiple other disk drives, the LUN is operating in RAID-3 mode. If both data and parity information are striped across multiple disk drives, the LUN is operating in RAID-5 mode.

The nature of non-volatile, vibration-free, small size and low power consumption has made flash memory an excellent component to be utilized in various flash storage devices. Flash storage devices are widely used as memory storage for computer and consumer system products such as notebook, desktop computer, set top box, digital camera, mobile phone, PDA and GPS etc. The increasing demand for more storage in these products has driven the need to expand the capacity of the flash storage devices.

There are two types of flash storage devices. The first type has a pre-defined mechanical dimension. This type includes: (a) Secure Digital (SD) card, (b) Multi Media Card (MMC), (c) Memory Stick (MS) card, (d) Compact Flash (CF) card, (e) Express Flash card, (f) Serial ATA Flash disk, (g) IDE Flash disk, (h) SCSI Flash disk, etc.

The second type of flash storage devices has no pre-defined physical dimension, which includes USB flash disk, Disk On Module (DOM), MP3 player etc. However, corresponding based upon the need for the system compactness, it is generally desirable to make this type of flash storage device as small in size and as high in capacity as possible.

Space constraints and available flash memory density are the major obstacles in expanding the capacity of the flash storage devices. A secure digital (SD) card is defined with a form factor. This fixed dimension restricts the number of components populated on a printed circuit board (PCB). For instance, if thin, small out-line package (TSOP) type of flash memory is used, only a flash memory chip and a flash controller can be placed in the space constraint. The available flash memory density further limits the overall SD card capacity.

A flash memory die is the basic element of flash memory. A typical flash memory chip comprises a flash memory die mounted on a substrate within an enclosure and the electrical signals are bonded out to the metal contacts of the package. Popular package types for flash memory chip are TSOP, WSOP (Very Very Thin Small Out-line Package) and BGA (Ball Grid Array) etc.

Advances in semiconductor technology have lead to an increase in the use of a semiconductor solid state drive (also known as a solid state disk or SSD) which uses a flash memory as a storage device, in areas such as computer systems. Thus, in at least some cases there seems to be a trend towards the use of an SSD as a storage device instead of a magnetic disk. In spite of having features such as, for example, a relatively small storage capacity and a relatively high price, the SSD has some other features that can make it more attractive as a storage device than the conventional magnetic disk in at least some cases.

Features that can make SSDs preferable as storage devices are, for example, a fast access rate, high throughput, a high integration density, and stability against an external impact. SSDs can move much larger amounts of data and process far more I/O requests, per time period, than conventional magnetic disks. This allows users to complete data transactions much more quickly.

Furthermore, advances in manufacturing technologies for SSDs may reduce the production costs of SSDs and also increase the storage capacities of SSDs. These developments may provide further incentive to use SSDs in place of magnetic disks in at least some cases.

Solid state disk systems may also comprise communication controllers, such as Fibre Channel (FC) controllers, Ethernet mechanisms, ATA or serial ATA interfaces, or SCSI controllers for managing data communication with external computing devices.

SUMMARY OF THE INVENTION

A system is used in caching with flash-based memory. First and second controllers communicate with a flash-based cache. A magnetic disk array is in communication with the flash-based cache. The flash-based cache has a dual ported link to the first and second controllers. The flash-based cache has flash-based memory components arranged in a RAID data protection scheme.

One or more implementations of the invention may provide one or more of the following advantages.

More cache can be provided at reasonable cost, making the cache more effective. The benefits of high-write duty cycle endurance can be provided for high-frequency write applications, while maintaining lower cost and high access rates for other applications. Rapid controller failover can be provided, without the need for copying data constantly. Multiple RAID redundancy techniques can be applied to cache for varying levels of cost, performance, and reliability.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

In accordance with a technique as described below, caching with flash-based memory is provided. In an example implementation of the technique, a caching mechanism use a set of dual-ported flash-based disk drives to store frequently accessed data within a storage array. The flash disks provide large capacity at much lower cost than DRAM technologies, and can be configured to provide additional functionality due to its non-volatile nature.

Conventionally, caches are typically built out of DRAM memory, which is volatile and requires a lot of standby power. It is also conventionally designed as a function within a controller design, and therefore must be duplicated in high-availability architectures to be able to seamlessly handle controller failures with no loss of data. During a power loss, conventionally the DRAM data must be copied into some other non-volatile memory in order not to lose it, requiring batteries or some other form of short-term energy storage to affect the transition.

Flash memory is slower than DRAM but much faster than magnetic hard disk, making flash memory a good candidate for caching data. Flash memory is also nonvolatile, which avoids some complications. The lower cost of flash memory as compared to DRAM also means that more cache can be provided at reasonable cost, making the cache more effective and at least partially mitigating the lower speed. Flash memory can also be combined with DRAM technology to provide the benefits of high-write duty cycle endurance for high-frequency write applications, while maintaining lower cost and high access rates for other applications. The dual-porting nature of disk-like interfaces allows for rapid controller failover without the need for copying data constantly, and the modularity of at least some types of flash memory allows for multiple RAID redundancy techniques to be applied for varying levels of cost, performance, and reliability.

Figure 1:
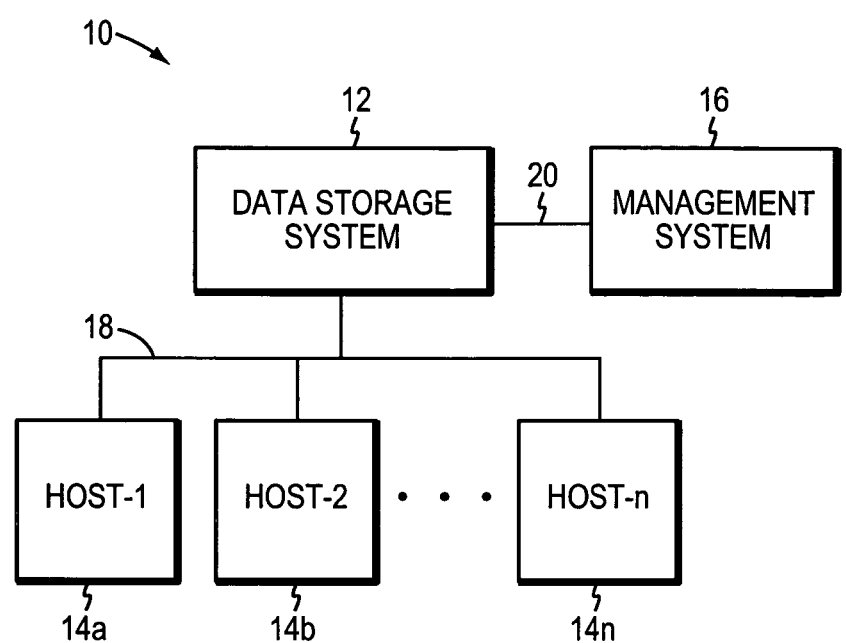
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

Figure 2:
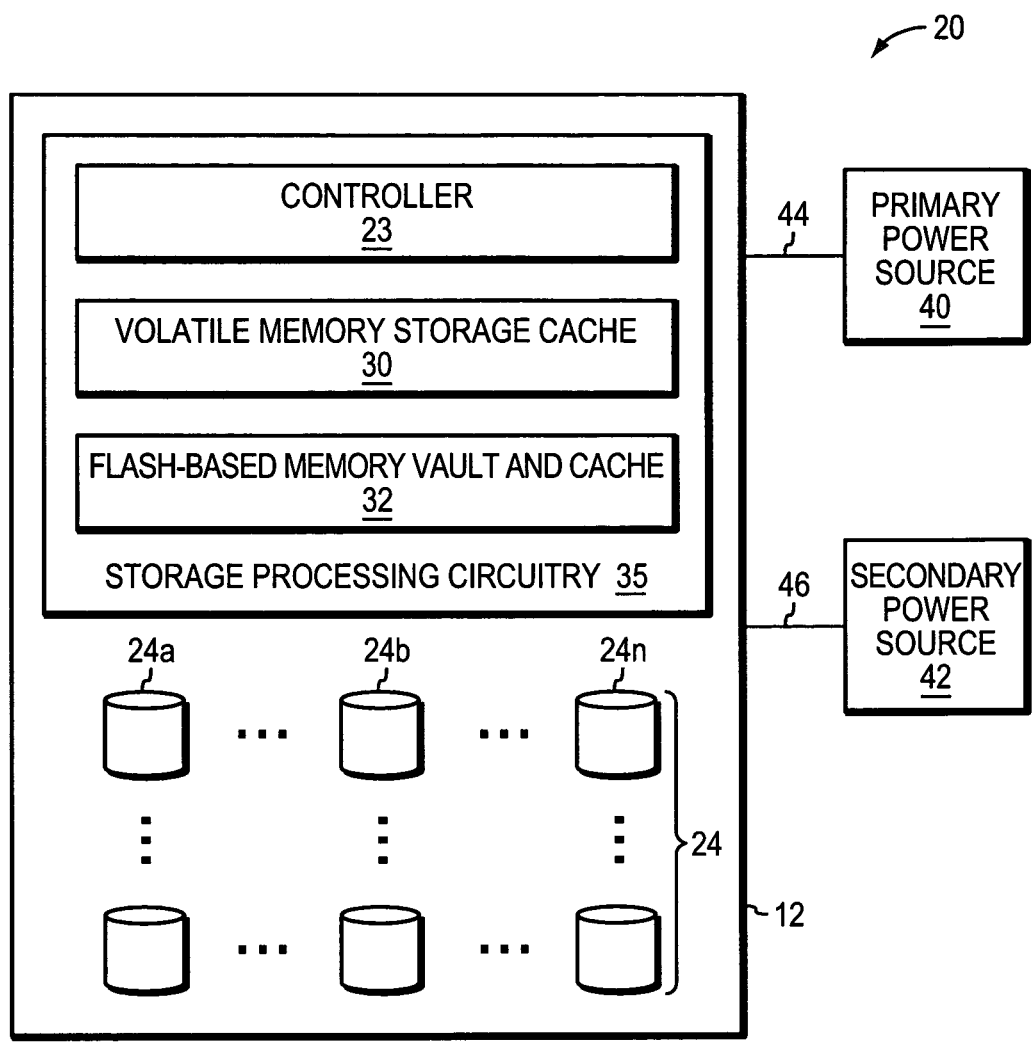
FIG. 2 is a diagram illustrating in more detail components that may be used in connection with techniques herein.

Referring to FIG. 2, shown is a more detailed representation of components that may be included in an embodiment using the techniques herein. In the example 20, a data storage system 12 may include disks 24 accessed by logical volumes as described above. The data storage system 12 may also include one or more controllers 23, one or more volatile memory caches 30, and a flash-based memory vault and cache 32. The example 20 also includes a primary power source 40 and a optional secondary power source 42. The primary power source may be configured to provide power to the data storage system 12 under normal operating conditions. The primary power source may be an external power source. The secondary power source may be, for example, a set of batteries configured to provide backup power to the storage processing circuitry 35 in the event of a loss of primary power from source 40. Upon the event of a loss of primary power, a signal may be sent to the data storage system by either the source 40 or the source 42 to indicate that backup power is being utilized.

Each of the one or more volatile memory (VM) storage caches 30 may include any one or more different types of volatile memory, such as RAM. The flash-based memory vault and cache 32 is a flash-based memory or solid state drive (SSD) which is non-volatile to store data persistently. The flash-based memory component 32 may be used as both a write cache and effectively a vault area in accordance with techniques herein. The data storage system 12 may utilize a write-back caching technique in which data for a write request is first written to VM cache 30. The VM cache 30 is used to designate some portion of VM used as a write cache although there may be other VM included in the data storage system for other purposes. Depending on the implementation, during normal operation, at least some data may be stored from the VM cache 30 to a portion of the component 32, which data may be destaged at a later point from the component 32 to disk. Upon the occurrence of an event, such as a power failure of the primary power source 40, the data storage system may perform a vaulting operation to copy contents of the volatile memory storage cache 30 to a nonvolatile memory, e.g., a vault area of the component 32.

The controller 23 may be configured to perform data storage operations on behalf of the hosts of FIG. 1 during normal operation using the volatile memory storage cache 30, the flash-based memory vault and cache 30, and the disks 24. As described above during normal operation, when a host sends a request to write data to the data storage system, the controller 23 stores the data of the write request in the VM cache 30 and/or in a portion of the component 32. At some point later, the data may be destaged or written out to the disks 24 from the VM cache 30 and/or the component 32. The controller 23 may also be configured to perform the vaulting operation as described above copying any remaining portions of the volatile memory storage cache 30 which are currently not stored in nonvolatile memory to nonvolatile memory.

As will be appreciated by those skilled in the art, the data storage 12 may also include other components than as described for purposes of illustrating the techniques herein.

Figure 3:
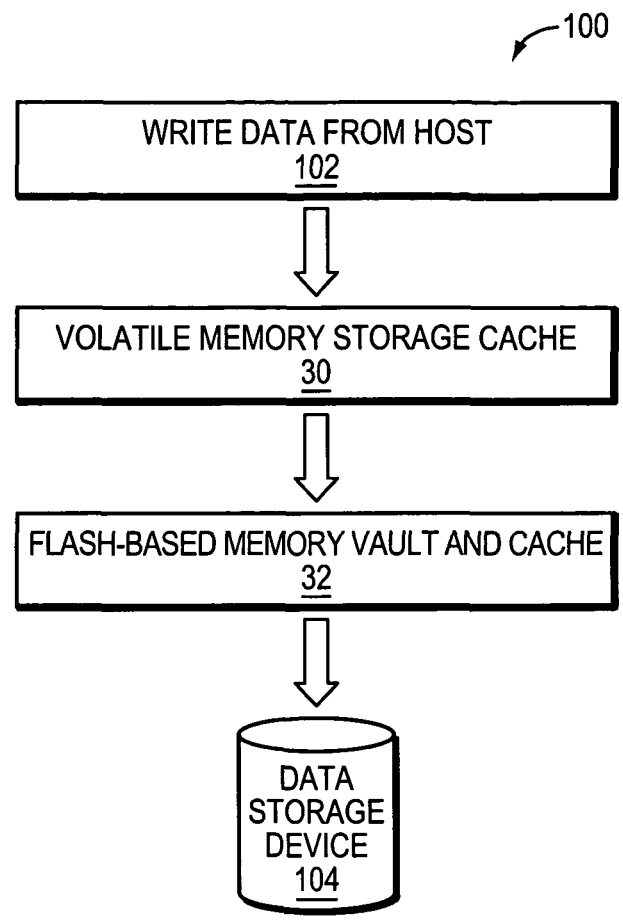
FIG. 3 is a flow diagram of a procedure for use with the computer system of FIGS. 1-2.

Referring to FIG. 3, shown is a flow diagram illustrating an example of flow of data in the data storage system. During normal processing as described herein, the write data received from the host 102 is cached in the VM cache 30. At least some data from the VM cache 30 is copied from the component 30 to a portion of the flash-based memory vault and cache 32. At some point later, the data is destaged from the component 32 to the data storage device 104, such as the disks 24 of FIG. 2. The foregoing is one of several different processing techniques that may be utilized in an embodiment.

Figure 4:
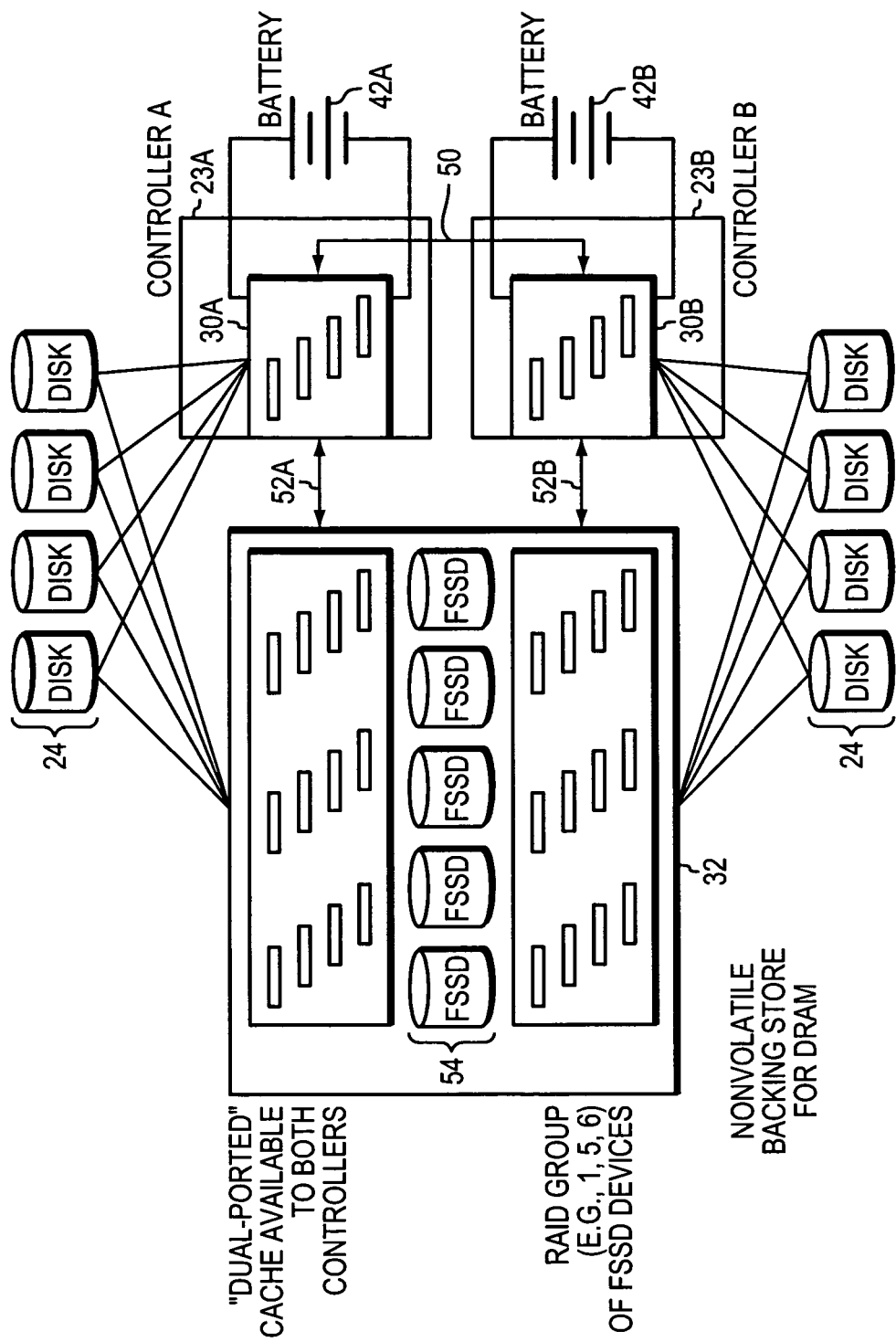
FIG. 4 is a block diagram of a specific implementation of the computer system of FIGS. 1-2.

FIG. 4 illustrates a specific implementation of the data storage system of FIG. 2, in which dual controllers 23A, 23B have respective DRAM-based VM caches 30A, 30B communicating via a cache mirroring interface 50 and supported by respective secondary power sources (e.g., batteries) 42A, 42B. Controllers 23A, 23B communicate over links 52A, 52B with component 32 which has flash-based memory including modular memory such as flash-based solid state disks (SSDs) 54. Component 32 and controllers 23A, 23B communicate with disks 24.

The arrangement of FIG. 4 may be used advantageously in one or more of multiple different ways, allowing higher performance lower cost data storage systems to be provided. For example, component 32 may serve as an extension of VM caches 30A, 30B, making at least a portion of the overall cache nonvolatile and making it scalable through addition of more flash-based cache, e.g., more SSDs or other flash-based memory modules. In particular, where component 32 includes flash-based modules tied together in communication, data in component 32 can be protected from memory failure by use of RAID techniques.

In another example, the handling of host I/Os may be partitioned, so that some I/Os are processed using VM caches 30A, 30B, and some are processed using component 32.

In a case in which component 32 is dual ported, such that both controllers 23A, 23B can simultaneously access all of the memory of component 32, controller level failover is simplified in comparison to VM caches 30A, 30B, for high availability. For example, if controller 23A fails, controller 23B can carry on using data in cache 30B as long as any necessary context switching has been successful and mirroring interface 50 has been successful in maintaining the integrity of cache 30B before such failure, but in any case controller 23B can carry on using data in component 32 because it is the same memory that was used by the failed controller, and is protected by RAID, not by an interface such as interface 50.

Component 32 may use any form factor with a dual port for connection over links 52A, 52B to both controllers 23A, 23B, e.g., PCI, SAS, Fibre Channel, and/or an internal fabric.

The nonvolatile nature of component 32 allows its large capacity to be used as a cache while avoiding some problems of a DRAM cache of the same size. For example, since DRAM is volatile, secondary power source 42 is needed in the event of a failure of primary power source 40 so that the data in VM cache 30 can be preserved long enough to be copied out in a vaulting operation to nonvolatile memory such as disk. The larger the VM cache, the more data needs to be copied out, and the larger the secondary power source needs to be and/or the faster the copying needs to be, which can be an engineering challenge. However, since component 32 is nonvolatile, it is effectively its own vault in the event of power failure, and its data, no matter how large, need not be copied anywhere.

The larger the cache, the more the cache can be used for sophisticated caching schemes to increase the performance of the system, especially by use of metadata, e.g., describing how and when data is being used. For example, if a midrange data storage system has 600 GB of flash-memory based caching, techniques beyond standard prefetching may be used to increase the chance that data being used is available in the cache as often as possible. In addition or instead, if component 32 is large, space can be made there to hold information that the system needs when it is first turned on or booted up, so that such information is available much earlier than is the case if such information is loaded from disks which must be spun up and initialized.

With respect to RAID protection in component 32, if modules such as components 54 are arranged in a RAID configuration and one such component fails, data integrity is maintained and the component can be replaced and its data can be rebuilt from the other modules in the RAID group much as a RAID protected disk that fails can be replaced and its data can be rebuilt from the other disks in the disk's RAID group.

In some implementations, the size of VM caches 30A, 30B can be reduced relative to the size of component 32, in some cases to the point that VM caches 30A, 30B serve only or primarily as buffers to receive I/Os from the hosts. In such cases, cache mirroring interface 50 is unnecessary because component 32 serves as the write cache and a write I/O from a host may be acknowledged to the host as complete once the data has been copied from such buffers to component 32, and read I/Os can be serviced directly from component 32.

In another implementation, a large cache based on component 32 may improve the performance of random I/O intensive operations, such as operations related to data deduplication. Magnetic hard disks have higher performance on sequential read or write operations than on random read or write operations, primarily because the latter require moving the hard disk's mechanical head, which takes significant time. Unlike magnetic hard disk, flash based memory devices have little or no performance difference between sequential and random read or write operations. Accordingly, if an application needs to access data in many non-sequential locations on one or more magnetic hard disks, performance can be improved by loading such data into cache where it can be accessed without involving random read or write operations on disk.

In general, since a cache based on component 32 can be made large without at least some of the disadvantages of making caches 30A, 30B large as discussed above, the system can make use of the space in the cache to apply techniques to increase the performance of the system beyond conventional prefetching, such as sophisticated techniques to determine what should be kept in the cache and how long data should remain the cache, and/or to track when data is flushed out. For example, if the system determines that a particular dataset is used at the same time every day (e.g., overnight), the system can cause the dataset to be loaded into cache at an appropriate time. Overall, if the cache is large enough to hold all or nearly all of the data that applications need at any particular time, it becomes less important whether prefetching based on prediction is successful.

Another advantage of the configuration of FIG. 4 is that unlike VM caches 30A, 30B, component 32 is not necessarily built into the controllers, so that scalability is provided without affecting the packaging or design of the controller.

In another advantage, flash-based component 32 uses much less power than DRAM-based caches, and in at least one implementation one or more portions of component 32 may be turned off if not needed, to conserve energy, without risk of losing data in component 32, and can be accessed when needed with little delay (e.g., milliseconds) after re-powerup. Also for power savings, in the case of a large cache based on component 32, the system may apply a strategy that favors power savings over throughput performance, so that, for example, one or more of disk drives 24 are turned off once data from such one or more drives is loaded into component 32, and the drives are not turned back on until data is needed that is not already available from component 32. In another variation, only a limited working dataset is presented to the host at one time, so that when the host switches executing applications, data related to the old application is flushed from component 32 to appropriate disks, which are then turned off, and data related to the new application is loaded into component 32 from disk. In general, component 32 may be used as a paging device.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A system for use in caching with flash-based memory, the system comprising:

first and second controllers communicating with a flash-based cache, wherein the first controller communicates with a first volatile memory cache and the second controller communicates with a second volatile memory cache; and a magnetic disk array in communication with the flash-based cache;

wherein the flash-based cache is in communication with the first and second volatile memory caches, wherein the flash-based cache serves as an extension of the first and second volatile memory caches by providing the flash-based cache for caching data in addition to the first and second volatile memory caches, wherein the flash-based cache represents a non-volatile portion of a cache subsystem of the system, wherein the cache subsystem includes the flash-based cache and the first and second volatile memory caches, wherein a write I/O from a host is acknowledged to the host as complete once the data from the write I/O has been copied to the flash based cache;

the flash-based cache has a dual ported link to the first and second controllers, wherein the dual ported link enables the first and second controllers to simultaneously access memory in the flash-based cache, wherein the dual ported link enables the first controller to continue accessing the memory in the flash-based cache upon failure of the second controller; and the flash-based cache has flash-based memory components arranged in a RAID data protection scheme.

2. The system of claim 1, wherein the handling of host I/Os is partitioned, so that some of the host I/Os are processed using the volatile memory cache, and others of the host I/Os are processed using the flash-based cache.

3. The system of claim 1, wherein the flash-based cache is effectively its own vault in the event of power failure.

4. The system of claim 1, wherein the flash-based cache uses metadata describing how and when data is being used.

5. The system of claim 1, wherein the flash-based cache holds information that the system needs when the system boots up, before disks of the magnetic disk array are spun up.

6. The system of claim 1, wherein if a flash-based memory component fails, data integrity is maintained and the flash-based memory component can be replaced and its data can be rebuilt from the other flash-based memory components.

7. The system of claim 1, wherein if an application needs to access data in non-sequential locations on disks of the magnetic disk array, the data is loaded into the flash-based cache.

8. The system of claim 1, wherein the system causes an application's dataset to be loaded into the flash-based cached in advance of processing by the application.

9. The system of claim 1, wherein the packaging of the first and second controllers excludes the flash-based cache.

10. The system of claim 1, wherein a portion of the flash-based cache is turned off if not needed, to conserve energy.

11. The system of claim 1, wherein a drive of the magnetic disk array is turned off once data from said drive is loaded into the flash-based cache.

12. The system of claim 1, wherein when a host communicating with the system switches executing applications, data related to a first application is flushed from the flash-based cache to the magnetic disk array, a disk of the magnetic disk array is turned off, and data related to a second application is loaded into the flash-based cache.

13. The system of claim 1, wherein both first and second controllers can simultaneously access all of the memory of the flash-based cache.

* * * * *